Jan. 30, 1945.  I. E. OBERKAMPER  2,368,422
LOADING DEVICE FOR MANURE SPREADERS
Filed Feb. 18, 1944
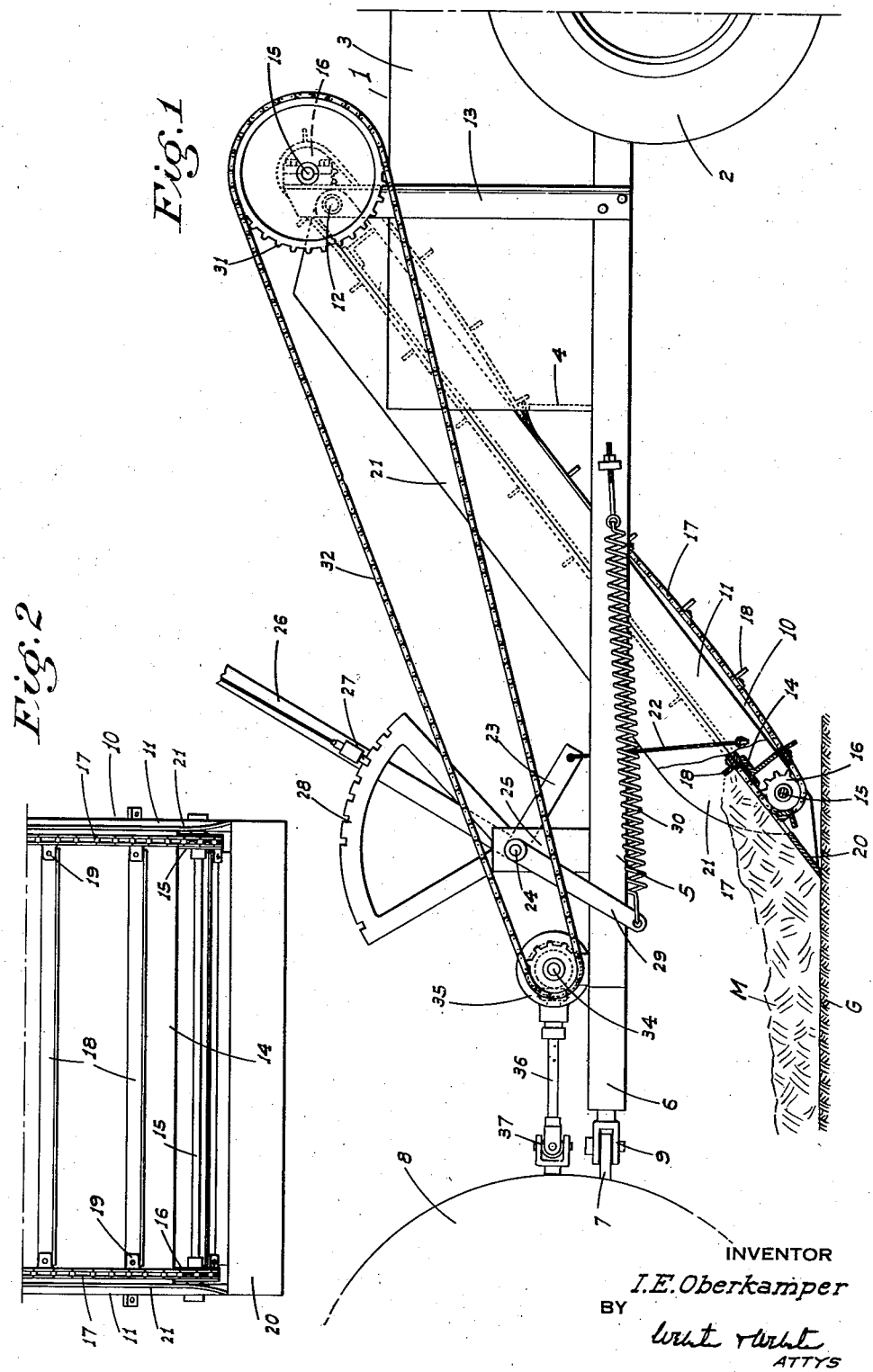
INVENTOR
I.E.Oberkamper
BY
ATTYS Patented Jan. 30, 1945

2,368,422

UNITED STATES PATENT OFFICE 2,368,422

LOADING DEVICE FOR MANURE SPREADERS

Ivan E. Oberkamper, Ceres, Calif., assignor of one-third to Elden L. Oberkamper and one-third to Orvis O. Oberkamper, both of Ceres, Calif.

Application February 18, 1944, Serial No. 522,917

4 Claims. (Cl. 214—83)

This invention relates to, and it is an object to provide, a novel loading device for a tractor drawn manure spreader.

A further object of this invention is to provide a loading device, as in the preceding paragraph, in which said device includes a power driven elevator conveyor, said elevator conveyor being driven from the power take-off shaft of the tractor to which the manure spreader is connected in draft relation.

An additional object of the present invention is to provide, in combination with a tractor-drawn, wheel-supported manure spreader which includes an open topped body; a loading device which comprises an elevator conveyor mounted in connection with the forward end portion of the manure spreader, said elevator conveyor extending from a discharge point above the body at a forward and downward incline to a termination at the lower end adjacent the ground, and in advance of the supporting wheels of the manure spreader, means to drive the elevator conveyor from the power take-off shaft of the tractor, and a transverse digging blade mounted on the lower end of the elevator conveyor and arranged to deliver thereonto.

It is also an object of this invention to provide a loading device, as in the preceding paragraph, in which said elevator conveyor and digging blade unit are mounted for vertical swinging adjustment about a pivot point adjacent the upper end of the conveyor whereby to selectively dispose said blade at a proper digging depth when the loading device is in operation, or to raise the blade clear of the ground when the loading device is not in operation.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation of a tractor-drawn manure spreader embodying the present invention.

Figure 2 is a fragmentary plan view showing the lower end portion of the elevator conveyor and the digging blade supported therefrom.

Referring now more particularly to the characters of reference on the drawing, the numeral 1 indicates a manure spreader of generally conventional construction; said manure spreader being supported above the ground by transversely spaced wheels 2. The manure spreader includes an open-topped body which includes transversely spaced upstanding sides 3 connected at the forward end by an upstanding front wall 4; said front wall extending upwardly from the bed of the body a limited distance whereby the forward end of said body above wall 4 is open for the purpose as will hereinafter appear. As usual the manure spreader includes, in the bed thereof, a rearwardly running conveyor (not shown) for the spreading device at the rear end of the implement.

The manure spreader includes a frame which projects forwardly some distance from the body and which frame includes transversely spaced beams 5 and a centrally disposed, forwardly projecting draft tongue 6; said tongue being adapted to be connected at its forward end with the drawbar 7 of a tractor 8 by means of a clevis and pin unit 9.

An elevator conveyor, indicated generally at 10, extends from a point above the body of the manure spreader at a forward and downward incline; said elevator conveyor being disposed between the forward and upper portion of the sides 3 and projecting downwardly between the frame beams 5.

The elevator conveyor 10 includes a conveyor frame 11 pivotally mounted at its upper end, as at 12, in connection with posts 13 which are fixed on and upstanding from the frame of the manure spreader rearwardly of the forward end of the body.

The conveyor frame 11 includes a substantially full length relatively wide floor 14, and at opposite ends said conveyor frame is fitted with transverse shafts 15, each of which carry a pair of axially spaced sprockets 16, the spacing of the sprockets being only slightly less than the width of floor 14. Endless conveyor chains 17 are carried by corresponding ones of the sprockets 16 on shafts 15. The shafts 15 and sprockets 16 are so disposed that the upper run of chains 17 rides on the marginal portions of the floor 14. Cross or conveyor cleats 18 of L-shape in cross section are secured by attachment links 19 to the chains 17; said conveyor cleats 18 being parallel to each other and equally spaced lengthwise of the conveyor. The conveyor cleats 18 are so mounted when in the upper run of the conveyor that one side thereof rides in scraping engagement with the floor 14.

At its lower end the conveyor frame 11 is fitted with a forwardly projecting, transversely extending digging blade 20 disposed at a forward and downward incline and in substantial alinement with the floor 14. Side or retaining plates 21 upstand from the conveyor frame 11 alongside the floor 14; said plates at their forward ends projecting slightly beyond the adjacent sprockets 16 whereby to reduce spillage laterally of the conveyor adjacent the digging blade 20.

The conveyor 10 is supported, adjacent its forward end and on each side by a flexible cable 22 connected at its upper end to a radial lever 23 fixed on a cross shaft 24 journaled between upstanding posts 25 on frame beams 5. A lever 26 is fixed rigid with shaft 24 and upstands therefrom, said lever including a manually releasable latch 27 cooperating with a notched quadrant 28 mounted in a fixed position. It will be seen that by manipulation of the lever 26 the vertical position of the elevator 10, including the digging blade 20, can be selectively adjusted. In order to counterbalance the conveyor 10, a radial lever 29 is fixed on and projects downwardly at a forward incline from the shaft 24, and a tension spring 30 connects between the lower end of lever 29 and a rearward point on the adjacent frame beam 5.

The elevator conveyor is driven by the following arrangement:

A sprocket 31 is fixed on one outer end of the uppermost shaft 15 outwardly of the adjacent post 13 and such sprocket is driven by an endless chain 32 carried at its other end by a drive sprocket 33 on a cross shaft 34. The shaft 34 leads from a gear box 35 mounted on the frame immediately to the rear of the draft tongue 6. The gear box 35 is driven by a short forwardly projecting shaft 36 connected by a universal coupling 37 with the power take-off shaft of the tractor; the universal coupling 37 being in vertical alinement with the pin of clevis unit 9 whereby to permit of steering of the tractor without interfering with the above described drive mechanism.

In use, the loading device is lowered to the position shown in Fig. 1, with the blade 20 riding on the ground G in digging relation to a layer of manure M. With advance of the implement, the manure M is dug or scraped from the ground by the blade 20 and delivered onto the lower end of the conveyor 10, whereupon the cross cleats 18 advance the manure up such floor to a discharge point at the upper end of said conveyor above the body of the manure spreader between the sides 3 thereof.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A loading device for a tractor drawn manure spreader which includes a manure receiving body; said device comprising an elongated elevator conveyor mounted in connection with the manure spreader, the conveyor extending lengthwise from a point above the body at a forward and downward incline, a digging blade mounted on the lower end of the conveyor and disposed to deliver to the latter, and means to drive the conveyor from the tractor; the body including upstanding sides and a forward end wall, the latter terminating at its upper edge a substantial distance below the corresponding edges of said sides, and the elevator conveyor extending between said upstanding sides adjacent the forward end thereof.

2. A loading device for a tractor drawn manure spreader which includes a manure receiving body, and a frame including forwardly projecting, transversely spaced frame beams; said device comprising an elongated elevator conveyor disposed between said beams at a forward and downward incline, the upper end of the conveyor being above and pivoted in connection with the body, means suspending the lower end portion of the conveyor from said beams for vertical adjustment, a digging blade on the lower end of the conveyor disposed to deliver to the latter, and means to drive the conveyor from the tractor; said suspending means comprising a cross shaft turnably mounted in connection with said beams, a radial lever on the shaft, a flexible cable connecting said lever with the conveyor, a hand lever mounted on and radiating from the shaft, and means to hold the hand lever in adjusted positions; there being another lever radiating from the shaft, and a tension spring connected with said other lever and tending to rotate the shaft in a conveyor raising direction.

3. A loading device for a tractor drawn manure spreader which includes a manure receiving body, and a frame including forwardly projecting, transversely spaced frame beams; said device comprising an elongated elevator conveyor disposed between said beams at a forward and downward incline, the upper end of the conveyor being above and pivoted in connection with the body, means suspending the lower end portion of the conveyor from said beams for vertical adjustment, a digging blade on the lower end of the conveyor disposed to deliver to the latter, and means to drive the conveyor from the tractor; said drive means comprising a transverse drive shaft included in the conveyor at its upper end, a sprocket on one end of the shaft, a gear box including a transverse counter-shaft mounted on the forward end of the frame, another sprocket on said countershaft, an endless chain connecting said sprockets, and a drive shaft unit projecting forwardly from the gear box and adapted for connection with the power take-off shaft of the tractor.

4. A loading device as in claim 3 with a universal draft unit including a vertical pivot connecting the manure spreader and tractor, and said drive shaft unit including a universal connection in vertical alinement with said pivot.

IVAN E. OBERKAMPER.